Jan. 27, 1959  W. C. DUANE  2,870,839
BATT CUTTING MACHINE
Filed Jan. 18, 1955  2 Sheets-Sheet 2

INVENTOR
WILLIAM C. DUANE
BY Williamson, Williamson,
Schroeder & Adams
ATTORNEYS

2,870,839

BATT CUTTING MACHINE

William C. Duane, Mankato, Minn., assignor to The Carney Company, Inc., Mankato, Minn., a corporation of Minnesota Application January 18, 1955, Serial No. 482,552

1 Claim. (Cl. 164—61)

This invention relates to a machine for reprocessing fiber batts, and more specifically relates to a machine for reducing fiber batts to small fragments or chunks of fluffed fiber material.

In the manufacture of mineral fiber or rock wool batts the cutting of the usable and salable batts substantially always results in the formation of irregularly-shaped scrap pieces. Such scrap pieces in that form are of comparatively little value because they cannot be sold as batts nor can they be sold as bulk or granular insulation.

An object of my invention is to provide a machine for reprocessing such pieces of batt material into valuable and salable form.

Another object of my invention is the provision of a new machine for forming small and fluffed fiber fragments or chunks from fiber batts in sheet form.

Still another object of my invention is the provision of a machine for fragmentizing fiber batts by cutting said batts into elongated strips and then severing the strips into small chunks or fragments, fluffing said chunks by impacting the strips with shearing effect.

A further object of my invention is to provide a machine of the class described which grips and carries mineral fiber batts into mechanism thereof for severing the batts in more than one direction to form small chunks of fiber and which mechanism also fluffs the chunks to separate the fibers thereof and thereby create an increased insulating air space between the fibers.

These and other objects and advantages of my invention will more fully appear from the following description made in connection with the accompanying drawings wherein like reference characters refer to the same parts throughout the several views and in which.

Figure 1:
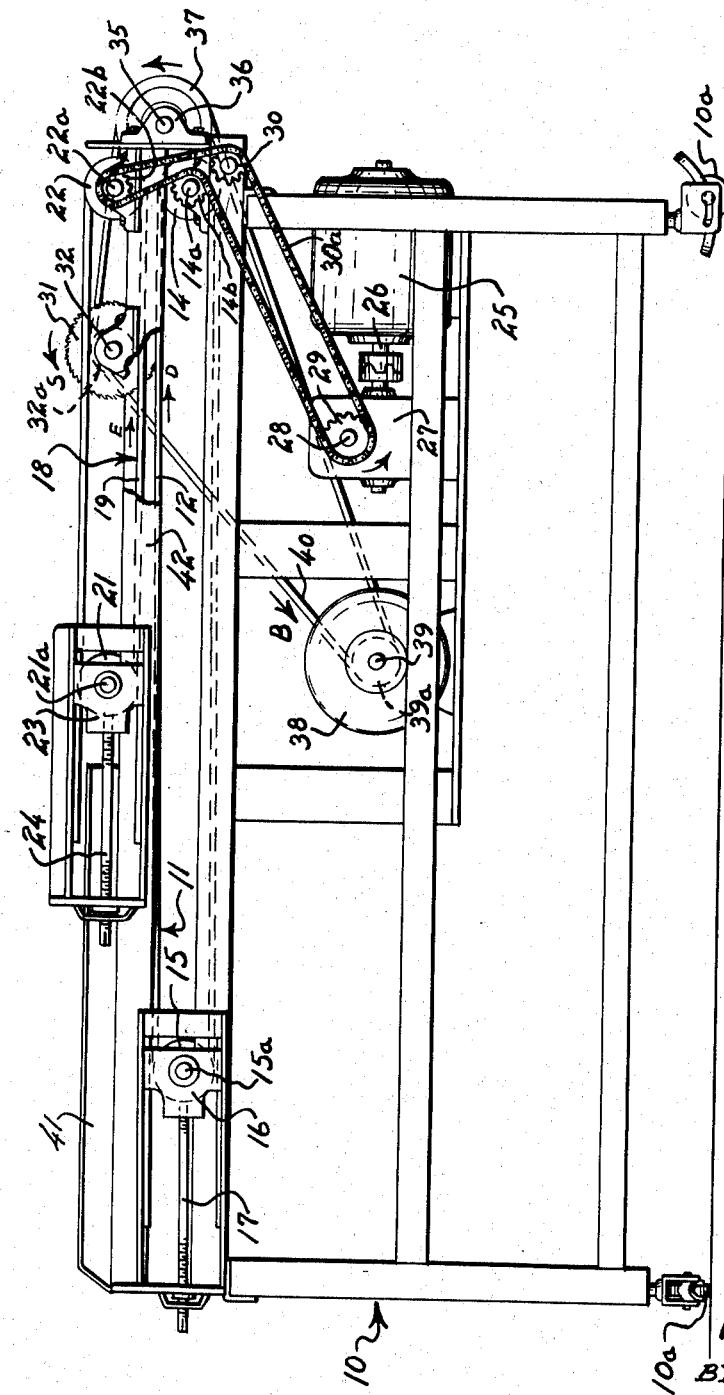
Fig. 1 is a side elevation view of my invention.
Figure 2:
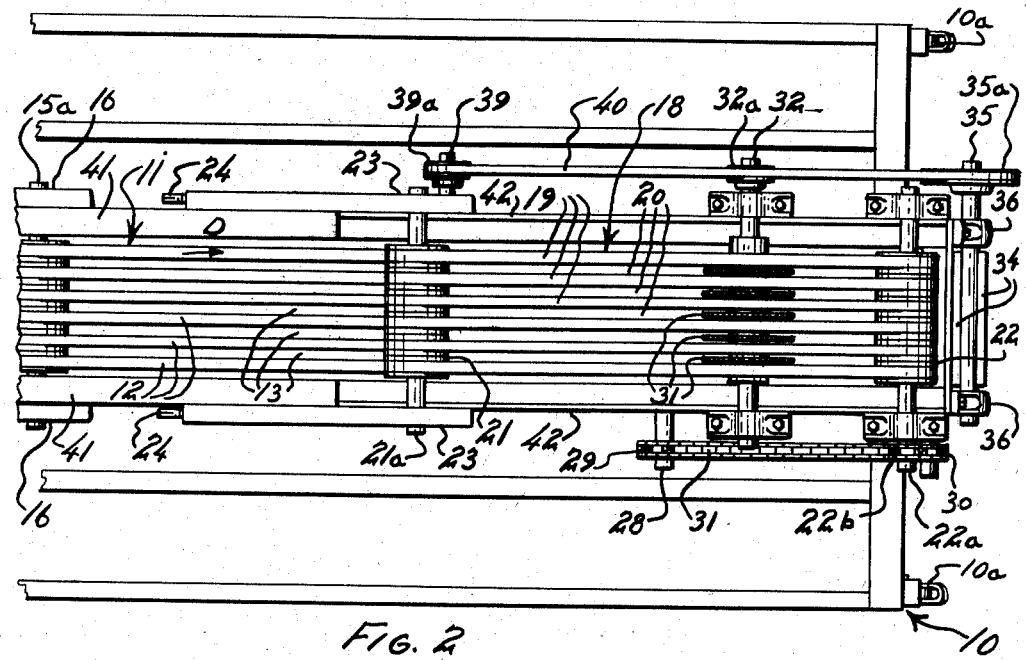
Fig. 2 is a top plan view of my invention which is partly broken away.

Although the machine which includes my invention is well suited to the fragmentizing or sundering of mineral fiber batts into small fluffed fragments or chunks, it will also be well suited to the severing of other materials in sheet form into small fragments or chunks.

The machine which constitutes my invention includes a frame 10 which may be constructed of any suitable rigid material such as angle iron and which, in the form shown, is provided with wheels or casters 10a to permit moving the machine about to various locations.

Means are provided in my invention for receiving and carrying the fiber batts through the machine, and in the form shown, said means comprise a continuously moving conveyor designated in general by numeral 11, which moves in the direction of arrow D and which has a material-receiving end and a discharge end. Conveyor 11 comprises a plurality of laterally spaced and parallel elongated flexible elements 12, which in the form shown consists in V-belts and which provide the conveyor with a plurality of elongated and laterally spaced surface segments for engaging the fiber batts and carrying the same toward the discharge end of the conveyor. By virtue of the construction of conveyor 11, a number of elongated and transversely spaced openings 13 are provided therein between the parallel belts thereof. Of course, roller chains may be substituted for belts 12 in which case the chains would be carried by sprocket wheels.

The belts 12 of conveyor 11 are suitably trained over pulleys or sheaves 14 and 15 respectively at the discharge end and receiving end of the conveyor and sheaves 14 are affixed to a rotary shaft 14a which is suitably journalled in bearings on frame 10. Sheaves 15 are mounted on shaft 15a which is supported for rotation and shifting movement on frame 10 to permit tightening and loosening of the belts. The belt-tightening mechanism includes a bearing 16 slidably mounted on frame 10 and having a threaded shaft 17 which is threadably secured to the frame 10 for shifting bearing 16.

Means are also provided for confining and holding the batts on conveyor 11 and, in the form shown, such means comprise a second conveyor designated in general by numeral 18 which is spaced above conveyor 11 and in opposed relation thereto and traveling in the direction of arrow E. Conveyor 18 also has a receiving end and a discharge end and is comprised of a plurality of parallel and laterally spaced endless conveyor belts 19, each of which is mounted opposite a respective belt 12 of conveyor 11 and provides conveyor 18 with a plurality of elongated and laterally spaced surface segments for engaging the batt carried by conveyor 11. Corresponding elongated openings 20 are thereby provided in conveyor 18 between belts 19. Belts 19 are trained over sheaves 21 and 22 which are respectively disposed at the receiving end and the discharge end of conveyor 18. Sheaves 22 are affixed to a rotary shaft 22a which is suitably journalled in bearings on frame 10. Sheaves 21 are mounted on a shaft 21a which is journalled in a bearing 23 which is slidably mounted on frame 10 and is positioned thereon by a screw shaft 24 which is rotatably mounted on frame 10. Sheaves 21 may thereby be shifted for tightening of belts 19.

Conveyor 18 essentially comprises a batt guide for cooperating with conveyor 11 to grip the batts carried therebetween and for urging the batts downwardly on the conveyor 11.

A source of power is provided for driving conveyors 11 and 18 and for synchronizing the speeds thereof to permit the conveyors to aid each other in moving the batt through the machine. In the form shown, such a source of power comprises an electric motor 25 having a rotation spindle 26 which is connected to a gear box 27 having a power output shaft 28 with a sprocket gear 29 carried thereon. Sprocket gears 14b and 22b are respectively carried to shaft 14a and 22a respectively and an idler sprocket wheel 30 is also journalled on frame 10. A sprocket chain 30a is trained over sprocket wheels 29, 30, 14b and 22b for transmitting power to the conveyors 11 and 18.

Means are provided for severing the batts carried on conveyor 11 into narrow and elongated strips and in the form shown, such means comprise a plurality of moving cutters or cutter blades which, in the form shown, constitute rotary saw blades 31 having the set removed. Each of the saw blades 31 extends in a plane disposed transversely of and between a respective pair of conveyor belts 12 and between a respective pair of conveyor belts 19. Rotary saw blades 31 are affixed to a rotary drive shaft 32 which is suitably journalled in bearings on frame 10. Saw blades 31 extend between conveyors 11 and 18 so as to engage and cut the batts carried therebetween.

Figure 3:
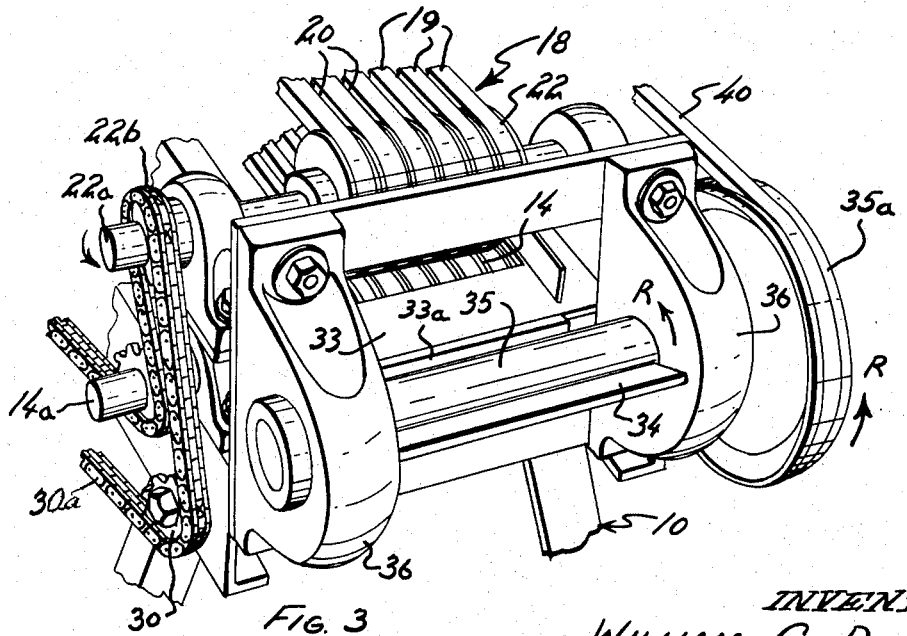
Fig. 3 is a perspective view of a portion of my invention showing the details thereof adjacent the discharge or output end thereof.

Means are also provided for severing the elongated strips of batt material adjacent to the discharge end of the conveyor into small and regularly formed chunks or fragments and for fluffing these fragments. In the form shown, such means include, as best shown in Fig. 3, a batt-guide support or anvil 33 which constitutes a plate affixed to frame 10 in substantial alignment with the material-carrying surface of conveyor 11 and which has an outer shearing edge 33a extending transversely of the direction of conveyor movement. A pair of elongated severing or shearing bars 34 are affixed to a rotary shaft 35 and extend axially thereof and substantially parallel with the outer edge 33a of the shear anvil 33. Shaft 35 is suitably journalled in bearings 36 which are affixed to frame 10. Shaft 35 is positioned so as to swing bars 34 downwardly into close proximity with the outer edge 33a of shear anvil 33 when shaft 35 is turned in the direction of rotation indicated by arrow R. A drive pulley 35a is affixed to shaft 35.

Suitable means are provided for rotating shaft 35 and bars 34 and for rotating the saw blades 31 and, in the form shown, such means include an electric motor 38 having an output spindle 39 with a belt pulley 39a mounted thereon for moving a drive belt 40 which is trained thereover and over pulley 35a and pulley 32a which is affixed to shaft 32. Belt 40 is driven in the direction of arrow B to drive the shaft 35 and bars 34 in the direction of arrow R and to drive the saw blades in the direction of arrow S.

Inclined and upstanding batt-guiding walls 41 may be mounted on frame 10 adjacent to the transverse sides of conveyor 11 for guiding the batts thereon. In addition, upstanding plates 42 may be mounted on the opposite sides of conveyors 11 and 18 to retain the batts therebetween and to prevent the elongated strips from shifting laterally outwardly from the conveyor.

In operation, motor 25 will drive the conveyors 11 and 18 in the direction of arrows D and E respectively, and motor 38 will continuously revolve saw blades 31 and shearing bars 34. Mineral fiber batts will be fed into the machine by placing them on conveyor 11 adjacent to the receiving end thereof whereupon the batts will be fed in succession toward the receiving end of conveyor 18. The belts 19 of conveyor 18 and the belts 12 of conveyor 11 will cooperate to grip each batt and carry the same into the saws 31 and toward the revolving bars 34. Because the conveyors converge toward each other slightly toward the discharge ends thereof, the batts will be firmly gripped as they move into the saw 31 so as to preclude uncontrolled slipping of the batts with relation to the conveyors.

It will be noted that because the rotation axis of the saw blades 31 is above the batt moving between the conveyors, the blades will engage the batts below the axis and in its downwardly swinging arc of rotation. The saw blades will thereby urge the batt downwardly into frictional engagement with conveyor belts 12 so as to cooperate with the opposed conveyors in restricting any slippage of the batt as it enters the saw. In addition, the saw blades will tend to draw the batt into the blade and thereby aid the conveyors in moving the batts through the saw and in moving the elongated strips formed by the saw toward the discharge end of the conveyors and into the strip-severing mechanisms, including revolving bars 34.

As the elongated strips of batt material are discharged from the conveyors, they move over the shear anvil 33 and over the outer edge 33a thereof. The shear bars 34 swing downwardly onto the fiber strips for impacting the same with shearing effect. The outer edge of the shear anvil and the revolving shear bars 34 cooperate to sever the strips into short chunks or fragments and the impacting also fluffs the chunks or fragments so as to separate the fibers thereof. The chunks will be impelled downwardly from the shear bars 34 and may be collected by any suitable means such as a container or hopper. The speed of rotation of the shear bars 34 is coordinated with the speed of the conveyors 11 and 18 so as to cause severing of the fiber strips after the conveyors have moved the strips through a certain distance so that the chunks or fragments will be of substantially uniform sizes.

In the form shown, the machine is adapted to receive and reprocess mineral fiber batts of approximately one inch in thickness and the saw blades are so positioned that the elongated strips formed will be approximately one inch wide. The speeds of the conveyor and rotary shear bars 34 are coordinated so as to produce fragments or chunks of fiber material in approximately one inch cubes. These dimensions and sizes are cited as being exemplicative of the operation of one form of the machine and it is within the contemplation of the present invention that the machine could handle batts of greater or lesser thickness and saw strips of greater or lesser width and to sever fragments of greater or lesser size as compared to the mentioned exemplary sizes. In addition it is also within the contemplation of the invention that the conveyors 11 and 18 could be relatively shiftable for movement toward and away from each other so as to adapt the machine for use with batts of various thicknesses. In addition, it should be noted that while the use of circular rotary saw blades is advantageous in the machine, other types of cutting or sawing media might be employed.

It should be noted that I have provided a machine for re-working scraps of sheet material such as rock wool batts into relatively small fragments or chunks of material of substantially uniform shape by cutting the sheet material into elongated strips and then severing the strips into fragments by impacting the same to substantially simultaneously sever and fluff the material which is then readily adaptable for use as bulk insulation where the material consists primarily of mineral or other types of fibers.

It will, of course, be understood that various changes may be made in the form, detail, arrangement and proportion of the parts without departing from the scope of my invention which consists of the matter described herein and set forth in the appended claim.

What is claimed is:

A machine for cutting and fluffing fiber batts of rock wool and the like, comprising a frame, a pair of spaced and opposed conveyors carrying such a batt therebetween, each of the conveyors comprising a plurality of laterally spaced and parallel endless belts each mounted opposite a corresponding belt of the other conveyor and each of said conveyors having a receiving end and a discharging end with said conveyors being substantially coterminus at the discharge end, said conveyors converging from the receiving ends thereof to the discharge ends thereof and being spaced apart at a point starting intermediate the ends thereof and extending to the discharge end less than the thickness of the batt such that a batt is constantly engaged between said conveyors and compressed thereby for a substantial extent of its length from said point to said discharge end and is progressively compressed as it approaches the discharge end of the conveyors, means driving said conveyors in synchronism with each other, a plurality of continuous moving cutter blades extending transversely of and between said conveyors and each disposed between adjacent belts of said conveyors for cutting batts into elongated strips, a shear anvil mounted in close proximity with the discharge end of the conveyor and having a cutting edge in the plane of the surface of one of said belts and being positioned in close proximity to the discharge end of said conveyors such that compressed batts issuing from the discharge end of the conveyors immediately pass over said cutting edge and while the batts are in an expanding condition after having been suddenly released from their compressed state as effected by the conveyors, upstanding guide and confining means positioned closely adjacent and along opposite sides of the conveyor and extending beyond said discharge end toward said anvil but terminating short thereof, said guide means being spaced apart to confine the batt therebetween as the conveyors compress and expel the batt, a severing bar positioned adjacent the edge of the anvil, means mounting said severing bar for rapid repetitious movement into close proximity with the outer edge of the anvil for impacting and severing the same in cooperation with the anvil edge and also fluffing the chunks from the compacted condition of the strips into expanded condition and means for driving the bar repetitiously into cooperating condition with the anvil edge.

References Cited in the file of this patent

UNITED STATES PATENTS

| | | |
|---|---|---|
| 55,336 | Merriam et al. | June 5, 1866 |
| 487,621 | Hidden | Dec. 6, 1892 |
| 527,051 | Cramby | Oct. 9, 1894 |
| 630,631 | Rousay et al. | Aug. 8, 1899 |
| 860,530 | Cormany | July 6, 1907 |
| 1,108,163 | Frick | Aug. 25, 1914 |
| 1,567,706 | Cameron et al. | Dec. 29, 1925 |
| 1,894,850 | Carlson | Jan. 17, 1933 |
| 1,959,418 | Fourness | May 22, 1934 |
| 2,298,221 | McLaughlin | Oct. 6, 1942 |
| 2,454,316 | Haecks | Nov. 23, 1948 |
| 2,692,645 | Driesch | Oct. 20, 1954 |

FOREIGN PATENTS

| | | |
|---|---|---|
| 568,737 | Great Britain | Apr. 18, 1945 |